(12) United States Patent
Shetty et al.

(10) Patent No.: US 7,945,615 B1
(45) Date of Patent: May 17, 2011

(54) DISTRIBUTED SHARED PERSISTENT OBJECTS

(75) Inventors: Pritham Shetty, Los Altos, CA (US); Srinivas Manapragada, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 997 days.

(21) Appl. No.: 11/263,590

(22) Filed: Oct. 31, 2005

(51) Int. Cl.
*G06F 15/16* (2006.01)
*G06F 15/173* (2006.01)

(52) U.S. Cl. .................................. 709/203; 709/238

(58) Field of Classification Search ............... 703/203
See application file for complete search history.

(56) References Cited

U.S. PATENT DOCUMENTS

| | | | |
|---|---|---|---|
| 5,751,968 A | 5/1998 | Cohen et al. | |
| 5,805,804 A | 9/1998 | Laursen et al. | |
| 5,841,432 A | 11/1998 | Carmel et al. | |
| 5,892,915 A | 4/1999 | Duso et al. | |
| 6,044,205 A * | 3/2000 | Reed et al. | 709/201 |
| 6,064,379 A | 5/2000 | DeMoney | |
| 6,085,252 A | 7/2000 | Zhu et al. | |
| 6,112,024 A | 8/2000 | Almond et al. | |
| 6,148,334 A | 11/2000 | Imai et al. | |
| 6,163,796 A | 12/2000 | Yokomizo | |
| 6,216,157 B1 | 4/2001 | Vishwanath et al. | |
| 6,393,486 B1 * | 5/2002 | Pelavin et al. | 709/238 |
| 6,397,230 B1 | 5/2002 | Carmel et al. | |
| 6,453,355 B1 | 9/2002 | Jones et al. | |
| 6,477,580 B1 | 11/2002 | Bowman-Amuah | |
| 6,487,564 B1 | 11/2002 | Asai et al. | |
| 6,549,934 B1 | 4/2003 | Peterson et al. | |
| 6,631,418 B1 | 10/2003 | Watkins | |
| 6,760,378 B1 | 7/2004 | Conklin | |
| 6,763,390 B1 | 7/2004 | Kovacevic et al. | |
| 6,801,947 B1 | 10/2004 | Li et al. | |
| 6,823,394 B2 | 11/2004 | Waldvogel et al. | |
| 6,877,010 B2 | 4/2005 | Smith-Semedo et al. | |
| 6,985,932 B1 | 1/2006 | Glaser et al. | |
| 6,990,497 B2 | 1/2006 | O'Rourke et al. | |
| 6,999,424 B1 | 2/2006 | Kovacevic et al. | |
| 7,003,570 B2 | 2/2006 | Messinger et al. | |
| 7,133,922 B1 | 11/2006 | She et al. | |
| 7,149,813 B2 | 12/2006 | Flanagin et al. | |
| 7,383,289 B2 * | 6/2008 | Kraft | 707/200 |
| 2001/0004417 A1 | 6/2001 | Narutoshi et al. | |
| 2002/0055989 A1 * | 5/2002 | Stringer-Calvert et al. | 709/220 |
| 2002/0065926 A1 | 5/2002 | Hackney et al. | |
| 2002/0103815 A1 | 8/2002 | Duvillier et al. | |
| 2002/0116716 A1 | 8/2002 | Sideman | |

(Continued)

OTHER PUBLICATIONS

U.S. Appl. No. 11/263,652, filed Oct. 31, 2005, Office Action dated Sep. 17, 2009, to be published by the USPTO, 27 pages.

(Continued)

*Primary Examiner* — Thu Nguyen
*Assistant Examiner* — Joseph Greene
(74) *Attorney, Agent, or Firm* — Fish & Richardson P.C.

(57) ABSTRACT

A system and method are described for managing a shared object in a distributed collaboration environment. The distributed collaboration environment is composed of at least one edge server in communication with a central server. When a client desires to modify the shared object, it issues an object modification request to the edge server it is connected to. The edge server compares the version identifier of the client shared object against the version identifier of the edge shared object. If the versions do not match, the edge server rejects the modification. Otherwise, it will forward the modification request to the central server for further consideration.

18 Claims, 4 Drawing Sheets

U.S. PATENT DOCUMENTS

| | | | |
|---|---|---|---|
| 2003/0046431 | A1 | 3/2003 | Belleguie |
| 2003/0061369 | A1 | 3/2003 | Aksu et al. |
| 2003/0115268 | A1* | 6/2003 | Esposito .................. 709/205 |
| 2003/0154239 | A1* | 8/2003 | Davis et al. ................ 709/201 |
| 2003/0187993 | A1* | 10/2003 | Ribot ......................... 709/227 |
| 2003/0221014 | A1 | 11/2003 | Kosiba et al. |
| 2004/0032424 | A1 | 2/2004 | Florschuetz |
| 2004/0098533 | A1 | 5/2004 | Henshaw et al. |
| 2004/0215803 | A1 | 10/2004 | Yamada et al. |
| 2006/0161516 | A1* | 7/2006 | Clarke et al. ..................... 707/2 |

OTHER PUBLICATIONS

U.S. Appl. No. 11/263,652, filed Oct. 31, 2005, Office Action dated Sep. 17, 2009, to be published by the USPTO, 27 pages.

Final Office Action in U.S. Appl. No. 11/263,652, mailed Aug. 5, 2010, 20 pages.

Fish & Richardson, Amendment in Reply to Action of Aug. 5, 2010 in U.S. Appl. No. 11/263,652, mailed Oct. 5, 2010, 18 pages.

"Quicktime Sreaming Server Administrator's Guide," Apple Compter, Inc. 2002.

"Chapter 6: What is Streaming Media and How does it Work?", RealNetworks, 1999, accessed Jul. 18, 2007, http://service.real.com/help/player/plus_manual.g2/htmlfiles/whatisrp.htm.

"Advantages of On2 VP6 Technology", On2 Technologies white paper, Oct. 20, 2006.

"Common Multimedia Formats and Extentions", SorensonMedia, accessed Jul. 18, 2007, <http://www.sorensotech.com/learn/video_file_format.php>.

"Common Multimedia Formats and Extentions", SorensonMedia, accessed Jul. 18, 2007, <http://www.sorensotech.com/learn/video_file_format.php>.

Schulzrinne, H. et al., "Real Time Streaming Protocol (RTSP)", The Internet Society, Apr. 1998.

* cited by examiner

DISTRIBUTED SHARED PERSISTENT OBJECTS

CROSS-REFERENCE TO RELATED APPLICATIONS

The present application is related to co-pending, and commonly assigned U.S. patent application Ser. No. 10/402,357, entitled "SHARED PERSISTENT OBJECTS"; and concurrently filed, co-pending, and commonly assigned U.S. patent application Ser. No. 11/263,652, entitled "NETWORK CONFIGURATION WITH SMART EDGE SERVERS"; U.S. patent application Ser. No. 11,263,582, entitled "SELECTIVELY PORTING MEETING OBJECTS"; and U.S. patent application Ser. No. 11/263,074, entitled "VIRTUAL GROUP CONNECTIONS", the disclosures of which are hereby incorporated herein by reference.

TECHNICAL FIELD

The present invention relates, in general, to distributed computing, and, more particularly, to shared persistent objects managed over a multiple server network.

BACKGROUND OF THE INVENTION

The client-server relationship has opened vast areas of network operability. Whether implemented in a local area network (LAN) or the Internet, the interaction between client entities and a centralized server forms the basis of the computing world today. Applications routinely incorporate remote use of data or logic to manage inventory, employees, sales, and other such activities. Early client-server applications involved remote access to databases to provide data for locally running applications. The management of such distributed functionality has advanced with several programming techniques and architectures. MICROSOFT CORPORATION'S Distributed Component Object Model (DCOM) and Common Object Request Broker Architecture (CORBA), developed by Object Management Group, are just two examples of architectures and specifications that allow programs at different locations, and possibly developed by different vendors, to communicate in a network through an interface broker.

With CORBA, the essential concept is the Object Request Broker (ORB). ORB support across a network of multiple computers with multiple clients and servers allows for a client program to request services from a server program or object without having to completely understand where that server program or object is, or what the interface to that server program or object requires. ORB's communicate requests and return replies by using the General Inter-ORB Protocol (GIOP) and, when used across the Internet, Internet Inter-ORB Protocol (IIOP). IIOP generally maps GIOP requests and replies into the Transmission Control Protocol (TCP) layer for each computer. Thus, the interfacing of the different entities is transparent to the user. DCOM works in a similar manner using TCP/Internet Protocol (TCP/IP) and hypertext transfer protocol (HTTP) to communicate remote procedure calls (RPCs) to the compatible server objects.

Both DCOM and CORBA follow a similar step-by-step process. A local application or object requests services from another, remote object. The remote object is located using the class ID (CLSID), for DCOM, or client ORB, for CORBA. This broker or agent arrangement operates in a similar manner to the stub and skeleton architecture used in Remote Procedure Call (RPC) communication. The stub, which is a small piece of communication code on the client system, operates as the proxy with the remote server, performing all communications with the skeleton, which is the corresponding communication code on the remote server. Therefore, the client does not have to address the different interface possibilities with the remote server. Once the request for service has reached the server object at the remote server, an instance of the object is downloaded to the client. The client may then run the instantiated object locally using the local user interface.

The common thread with DCOM and CORBA is that the distributed management performed by each architecture is directed to distributed computing. Code may be persistent between sessions and RPCs; data is not. Therefore, while logic may persist between sessions, data is generally session-specific.

Another tool of distributed or remote interactive computing is the cookie. A cookie is data created by a server-side connection, such as a common gateway interface (CGI) script, that can be used to both store and retrieve information on the client side of the connection. This addition of a simple, persistent, client-side state significantly extends capabilities of Web-based client-server applications. The standard specification for cookies began with NETSCAPE COMMUNICATION CORPORATION's "Persistent Client State HTTP Cookies" and continues with RFC 2109—"HTTP State Management Mechanism" issued by the Network Working Group of the Internet Engineering Task Force (IETF). These specifications define a size limit of 4096 bytes per cookie. Moreover, a limit of 20 cookies per Web server is also defined, which means than any one Web server can store a maximum of 20 4096-byte cookies on every client computer.

Cookies provide a way for Web sites to keep track of user patterns and preferences, and, with the cooperation of the Web browser, store the cookies on the client computer. Hypertext Transfer Protocol (HTTP), which is the transfer protocol of the Web, is a stateless protocol, such that each request for a Web page is independent of all other such requests. Therefore, the Web page server has no memory of the current state (i.e., what pages or information has previously been sent to or exchanged with the client computer). Cookies provide the ability for the user to experience a personalized session by providing the Web page and Web page server data that creates a remembered state of the user Web interaction.

In a typical example of operation, when a user at a client computer runs its Web browser and types in a Universal Resource Locator (URL), such as www.macromedia.com, the browser communicates with the Web server and requests the macromedia.com home page. On the client-side, once the request is made, the browser searches its cookie file for cookies designated for macromedia.com. If none are found, no cookies are sent. On the server-side, the macromedia.com Web server receives the request and attempts to read any cookies that may be transmitted from the requesting browser. If none are available, the Web server determines that this is the first time the client-browser has visited the macromedia.com Web site. The macromedia.com Web server may then direct that a cookie or cookies be saved onto the client computer marking the visit and identifying the client-side computer. When the client computer next makes a request for the macromedia.com home page, it will now typically send the cookies designated for the macromedia.com Web site. The macromedia.com Web site will read the cookies and be able to adjust the user experience at the client-side using this "state" information.

Some cookies persist only until the end of a specific browser session. Meaning that when the browser program is closed, the cookies are erased. However, when some cookies are created, they include an expiration date after which the cookie will expire and be erased from the designated cookie file. Thus, those cookies persist from one browser session to another residing on the client computer until the expiration date has been reached. Cookies may also be erased if the maximum cookie limit, which is a standard specification, is exceeded. In this situation, the most least accessed cookies will typically be deleted first. Therefore, most cookies are set once and then go away either (1) at the close of the current browser session; (2) until the cookie expiration date is reached; or (2) when the maximum number of cookies has been exceeded.

Cookies provide an adequate tool for simple Web interactions, such as remembering login information, setting up a shopping cart in an e-commerce Web site, or tracking user history information. However, for more complicated distributed Internet applications, cookies are somewhat inadequate. Cookies are limited solely to text formatting. Therefore, they can provide no distributed functionality or logic. Cookies are also single-version data. Once the cookie information is set, it does not change until the cookie expires. New information is generally saved as a new cookie. Furthermore, cookies are accessible by URL paths, so the capability exists for many different URLs may have an opportunity to use that information by including many different URLs in the path property of the cookie.

BRIEF SUMMARY OF THE INVENTION

The present invention is directed to a system and method for managing a shared object in a distributed collaboration environment. The distributed collaboration environment is composed of at least one edge server in communication with the central server running the collaboration. When a client desires to modify the shared object, it issues a modification request to the edge server it is connected to. Instead of forwarding the request on to the central server, the edge server compares the version identifier of the client shared object against the version identifier of the edge server shared object. If the versions do not match, the edge server rejects the modification. Otherwise, it will forward the modification request to the central server for further consideration.

In additional and/or alternative configurations, there will be intervening edge servers between the edge server connected to the requesting client and the central server. In these configurations, the client's edge server will forward the modification request to the next edge server on the route to the central server. At each edge server along the way, a check will be performed to ensure that the client's shared object version is the latest. Anywhere along the edge server route to the central server, it may be discovered that the client's version is outdated. Therefore, the edge server can reject the modification request without requiring processing time or bandwidth from the central server.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
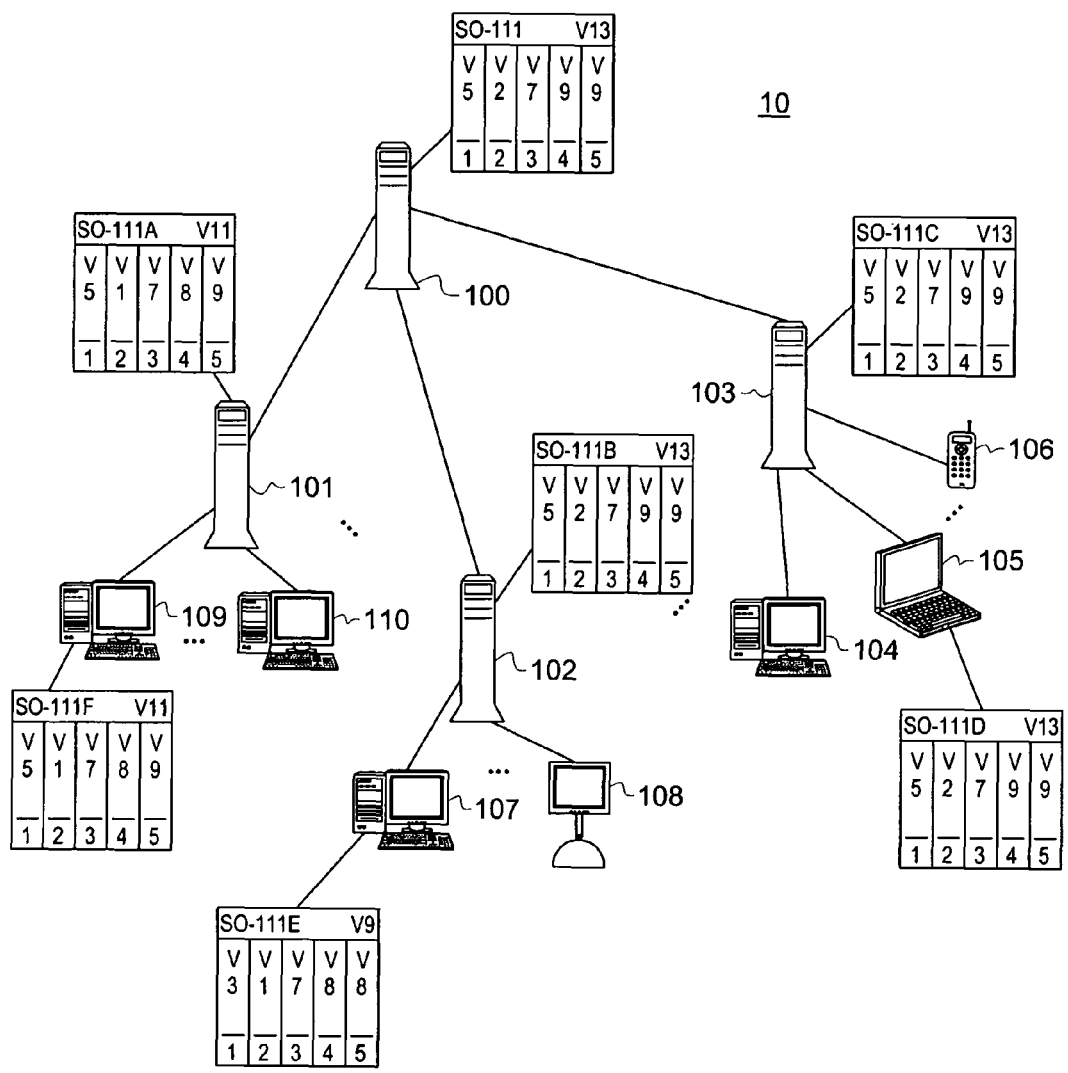
FIG. 1 is a block diagram illustrating an electronic collaboration system configured according to one embodiment of the present invention.

Object-Oriented Programming (OOP) is a well-known programming technique that decomposes problems into a collection of intercommunicating, self-contained entities composed of data and operations on the data. These self-contained entities are called objects. Objects typically have an internal state, which are the current values of its data, and methods, which are typically the only means by which the object's state can be inspected, modified, or processed by another object. Objects may include methods and data portion comprising data slots. Data slots may contain items such as plain values or other objects. For example, a data slot may contain the string "December" or the integer "15" or even another object. The methods may contain logic instructions that operate on the data contained in the data slots. For instance, a method may contain logic for writing the value contained in a data slot to a certain memory location in the host computer.

Objects, once created, can be reused, can intercommunicate, and return values for any number of different desired tasks. An object has generally been shareable to the extent that the available data slots and corresponding methods are available to all host or client computers that have a copy of that object. However, the data or state information contained in an object on one host is typically not persistent across multiple hosts or clients. Thus, without more complexity added, typical instances of objects transmitted in DCOM and/or CORBA usually do not include any persistent data or state information.

Instead of providing distributed computing using the persistent code attributes of DCOM or CORBA that do not have the capability for handling persistent data or using cookies that have a limited ability for persistent data without the capability for providing persistent or distributed code, a new solution has been suggested in commonly-assigned, co-pending, U.S. patent application Ser. No. 10/402,357, entitled, "SHARED PERSISTENT OBJECTS," the disclosure of which is incorporated herein. This technology provides an object that may be shared in real-time by any accessible client, i.e., a shared object. A shared object is a container of data and logic used in processing a distributed application. Each shared object will generally have multiple slots in which various pieces of data or information may be stored. The complex functionality of the shared object is presented to a designer through a collection of abstract data types in an application programming interface (API), such that a designer with minimal programming skills and experience may effectively implement extremely complex features.

In this common technology, a distributed interactive multimedia application (DiMA) run on an interactive multimedia communication server (iMCS) maintains a main or global instance of a shared object, including all the active data slots in the object. The iMCS/DiMA assigns an object version identifier for the entire shared object along with individual slot version identifier. The iMCS/DiMA, therefore, maintains the current version of the shared object in addition to the current version of each data slot of the shared object.

The shared object provides data or information that is used in the operation of an interactive multimedia file (iMF), which is the client-side application implementing the DiMA. A local computer receives the iMF and begins running it using an interactive multimedia runtime (iMR), such as MACROMEDIA, INC.'s FLASH™ player or other such similarly capable interactive media player. The iMF stores a local instance of the shared object onto the local computer executing the iMR/iMF. In the distributed operation, the iMF communicates with the iMCS/DiMA, which manages interactions concerning any of the iMF running on any connected local clients.

When the iMF stores the local instance of the shared object, a version identifier is assigned locally that matches the version of the shared object obtained from the iMCS/DiMA. The iMF monitors any changes attempted to the various slots within the local instance of the shared object. Each attempted or proposed change to the shared object or any of its slots is eventually approved by the iMCS/DiMA. The iMCS/DiMA uses the version numbers to determine most approvals of changes. For example, if a client using a much earlier version attempts to modify the shared object, the iMCS/DiMA will reject the change because the slot has already moved beyond the point that the suggested change is coming from. If a change is, in fact allowed, the iMCS/DiMA will notify each client/participant of the change to the object slot. Furthermore, with each modification, the version number will be incremented at the iMCS/DiMA and propagated down through the participating clients. As a part of almost every interaction between the iMF and the iMCS/DiMA, the version identifiers are exchanged and compared between the clients and the iMCS/DiMA to assist in maintaining continuity of the shared application.

This technology described in commonly-assigned, co-pending, U.S. patent application Ser. No. 10/402,357, entitled, "SHARED PERSISTENT OBJECTS," has been employed in one embodiment or another in electronic meeting and collaboration applications, such as MACROMEDIA INC.'s BREEZE™, or other such similarly capable electronic meeting applications. In such applications, multiple meeting participants may view and manipulate various pieces of information. Thus, changes to the information within the shared objects is closely monitored throughout the collaboration system and propagated to each of the accessing client machines.

In early versions of BREEZE™, a single collaboration server was used to manage the entire collaboration session as well as providing direct connections to each meeting participant. Considering the complexity of maintaining a real-time, interactive multimedia electronic collaboration session, management by a single, central server provides the most logical and efficient implementation. However, by also providing all of the direct connections into the electronic meeting, a single-server implementation typically limits the number of possible meeting participants connected into the meeting at any given time. The levels of this limitation are purely the physical connection and processing limits of the collaboration server's processor.

Technology developed in commonly-assigned, co-pending, U.S. patent application Ser. No. 11/263,652, entitled, "NETWORK CONFIGURATION WITH SMART EDGE SERVERS," and commonly-assigned, co-pending, U.S. patent application Ser. No. 11/263,074, entitled, "VIRTUAL GROUP CONNECTIONS," the disclosures of which are incorporated herein by reference, have expanded the scalability of electronic collaboration systems. While an electronic meeting is still managed by a single collaboration server, connection management is moved down to smart edge servers that operate in conjunction with the collaboration server through virtual group connections, such that each connection to the collaboration server from a smart edge server constitutes only a single connection into the collaboration server, regardless of the number of users/meeting participants connected at the smart edge server.

In extending the shared object concept to collaboration systems having a smart edge server architecture, an inefficiency arises in the normal management of the shared object. In a single-server environment, when a user changes the information in a shared object, the user's local environment checks with the central server for authorization to change the object. If authorization exists, then the changed object is transmitted to the central server, which takes the change, updates the central data slot of the shared object that has been changed, and then copies the change to each of the other meeting participants connected into the central server. In the smart edge server configuration, however, a user checking authorization of the collaboration will first transmit the request to the smart edge server, which then would forward the check to the collaboration server. This means the user's request would be forwarded from the smart edge server to the collaboration server. If authorization is available, the change is transmitted from the user to the smart edge server and then from the smart edge server to the collaboration server. The collaboration server will then have to send a copy of the change to each user/meeting participant regardless of which smart edge server they were connected through, which would greatly increase the load on the collaboration server and the smart edge servers.

FIG. 1 is a block diagram illustrating electronic collaboration system 10 configured according to one embodiment of the present invention. The basic architecture of electronic collaboration system 10 reflects the technology described in commonly-assigned, co-pending, U.S. patent application Ser. No. 11/263,652, entitled, "NETWORK CONFIGURATION WITH SMART EDGE SERVERS." For purposes of example, electronic collaboration system 10 hosts an electronic meeting for participants 104-110. Collaboration server 100 maintains and manages the electronic meeting. Collaboration server 100 is connected to collaboration edge servers 101-103. Each of participants 104-110 connect into the electronic meeting, and, thus, are connected to collaboration server 100 through collaboration edge servers 101-103, respectively. One example of an electronic collaboration system, such as collaboration system 10, is BREEZE™.

Electronic collaboration system 10 is implemented by operating a server-side communication application on collaboration server 100 and collaboration edge servers 101-103. The server-side applications operate with collaboration server 100 being the central server in control of the electronic meeting and collaboration edge servers 101-103 communicating with collaboration server 100 to provide assistance with some of the meeting processing and for providing the virtual group connections into collaboration server 100. The connectivity and communications between collaboration server 100 and collaboration edge servers 101-103 is performed according to an embodiment of the technology described in commonly-assigned, co-pending, U.S. patent application Ser. No. 11/263,074, entitled, "VIRTUAL GROUP CONNECTIONS." Thus, even though at least seven participants (participants 104-110, are shown connected to the electronic meeting, collaboration server 100 only incurs a load of three connections, one from each of collaboration edge servers 101-103.

A client-side application operates on each of participants 104-110 that facilitates communication with collaboration server 100, through collaboration edge servers 101-103, and facilitates the presentation of the visual elements of the electronic meeting. In operation of the electronic meeting application, shared objects are used in providing shared information to all of the meeting participants. Shared object 111 (SO-111) provides five data slots (1-5) to the electronic collaboration application. Each data slot of SO-111 is managed by collaboration server 100 to reflect a current slot version identifier, as well as a container version identifier for SO-111 as the whole object. SO-111, as stored and maintained on collaboration server 100, is the main instance of SO-111 that controls the container and slot versions visible to participants 104-110 and controls the ability of participants 104-110 to make edits to the data of SO-111. A shared object, for example, may provide data or information for a shared cursor, a shared meeting pod, or the like. As a party moves the shared cursor or types/draws in the shared meeting pod, the data slots in the shared object change with the changes propagated down to the meeting participant and the client-side application managing the client-side electronic meeting.

Participants 104-110 operate within the electronic meeting as if they are each connected directly to collaboration server 100. Collaboration edge servers 101-103 are, therefore, practically transparent to participants 104-110. However, the connections to collaboration server 100 are, in fact, made through collaboration edge servers 101-103. Collaboration edge servers 101-103 communicate with collaboration server 100 in execution of the electronic meeting. Moreover, collaboration edge servers 101-103 manage the connections of their connected participants within the electronic meeting. As a part of this management, each of collaboration edge servers 101-103 receives an instance of SO-111 (i.e., SO-111 A-C) through communications with collaboration server 100. Each of these shared object instances resident on collaboration edge servers 101-103 are proxy shared objects to the main instance. Because the main instance controls the manipulation of the overall shared object, SO-111A-C are slaved to the main instance, SO-111. In most cases, the version of SO-111 on collaboration edge servers 101-103 will match the main version on collaboration server 100. However, due to some inconsistencies in connections and communications, the version may not always match.

Because collaboration edge servers 101-103 do not simply act as store-and-forward agents or remote caching servers, they incorporate the ability to perform partial processing and management for collaboration server 100 to assist in maintaining the electronic meeting. This ability allows collaboration edge servers 101-103 to assist in managing the shared objects. For example, participant 107 attempts to make a change to one of data slots 1-5 of SO-111E, the copy of SO-111 it has locally stored. When the request arrives at collaboration edge server 102, a copy of the shared object version numbers accompany the communication. Participant 107 would send the container version number for SO-111E in general, i.e., ver. 9, and also the slot version of the slot or slots that are proposed for change. In this example, the user desires to change the information for slot 1. Therefore, participant 107 would transmit container version 9 for SO-111E and version 3 for slot 1. Prior to forwarding the request to collaboration server 100, collaboration edge server 102 checks the shared object container version number, ver. 9, received from participant 107 against the shared object container version number of SO-111B maintained locally on edge server 102, ver. 13. Because the shared object version from participant 107 is clearly outdated, collaboration edge server 102 directly rejects the requested change. It does not have to send this determination up to collaboration server 100, which would increase the load on collaboration server 100.

It should be noted that in additional and/or alternative embodiments of the present invention, the edge server may compare the slot version number instead of the container version number of the client shared object. For example, if participant 107 requests to change slot 2, it sends its container version, ver 9, and slot 2 version, ver 1, to edge server 102. Edge server 102 compares its slot version number for slot 2, ver. 2 against the client container version, ver 9. Because the slot version of edge server 102 is lower than the client container version, ver 9, edge server 102 sends the request on to collaboration server 100. Collaboration server 100, would compare the client slot version against the client slot version and reject the request.

In other additional and/or alternative embodiments of the present invention, the edge server compares its slot version against the client slot version. Thus, if participant 107 requests to change slot 2, it sends its slot version, ver 1, to edge server 102. Edge server 102 would compare the client slot version against its own slot version, ver 2. Edge server 102 would then reject the change request because its slot version is greater than the client slot version.

In addition to the change rejection that that collaboration edge server 102 issues back to participant 107, collaboration edge server 102 will transmit a full copy of SO-111B to participant 107 in order to update SO-111E to the most current version available to collaboration edge server 102. Thus, in assisting with the administration of the editing functionality of the distributed shared objects system, collaboration edge server 102 also assists in maintaining the synchronization of the shared objects, making electronic collaboration system 10 both self-correcting and self-synchronizing.

Participant 105, with SO-111D stored locally, attempts to make a change to one or more of data slots 1-5. As the change request proceeds to collaboration edge server 103, participant 105 transmits the container version numbers of SO-111D along with it. Before acting on the request, collaboration edge server 103 compares the container version of SO-111D, ver. 13, against the container version number of its own local instance of the shared object, SO-111C, ver. 13. Because the versions are the same, collaboration edge server 103 forwards the change request to collaboration server 100. Collaboration edge server 103 also transmits the version number of SO-111C to collaboration server 100. Collaboration server 100 compares the transmitted container version number, ver. 13, against the container version of the main shared object instance, SO-111, ver. 13. As the transmitted distributed container version number is the same as the main instance version, collaboration server 100 allows the change.

In order to implement the allowed change, collaboration server 100 transmits an acknowledgement to collaboration edge server 103. Collaboration edge server 103, which holds the proposed shared object change, distributes the changes to each of participants 104 and 106 and verifies to participant 105 that the change was accepted. Collaboration server 100 transmits the changes to SO-111 to collaboration edge servers 101 and 102, each of which continues to distribute the changes to SO-111 to each of participants 107-110.

In another example of operation, participant 109 attempts to change one of data slots 1-5 of SO-111F. Participant 109 transmits the proposed change to collaboration edge server 101 along with the container version numbers of SO-111F, ver 11. Due to an abnormality in communication between collaboration edge server 101 and collaboration server 100, the container version of SO-111A has not been updated beyond version 11, even though the main instance of SO-111 is version 13. However, because SO-111F is version 11 and SO-111A, of collaboration edge server 101, is version 11, collaboration edge server 101 forwards the change request, including the container version number of SO-111A/F to collaboration server 100. Collaboration server 100 compares the container version of SO-111A/F against the version of the main instance SO-111 and determines that the proposed change is to be rejected. Collaboration server 100 sends the rejection notification to collaboration edge server 101, which notifies participant 109 that the proposed change was rejected. During this rejection communication between collaboration server 100 and participant 109, collaboration server 100 sends the updated data slots to collaboration edge server 101 and participant 109 to update the particular data slots of data slots 1-5 of both SO-111A and SO-111F.

It should be noted that during the update and change request process, selected embodiments of the present invention transmit only the data changed in the particular slot of the shared object. This selective transmission reduces the required bandwidth and data processing that occurs in any of the entities, from collaboration server 100 to collaboration edge servers 101-103 to participants 104-110.

It should also be noted that in additional and/or alternative embodiments of the present invention, as the collaboration edge server rejects a proposed change, it does not automatically update the shared object version on the requesting entity. Various embodiments of the present invention may provide for a signal back to the requesting entity that it should update its shared object version from the main collaboration server before requesting another change.

Figure 2:
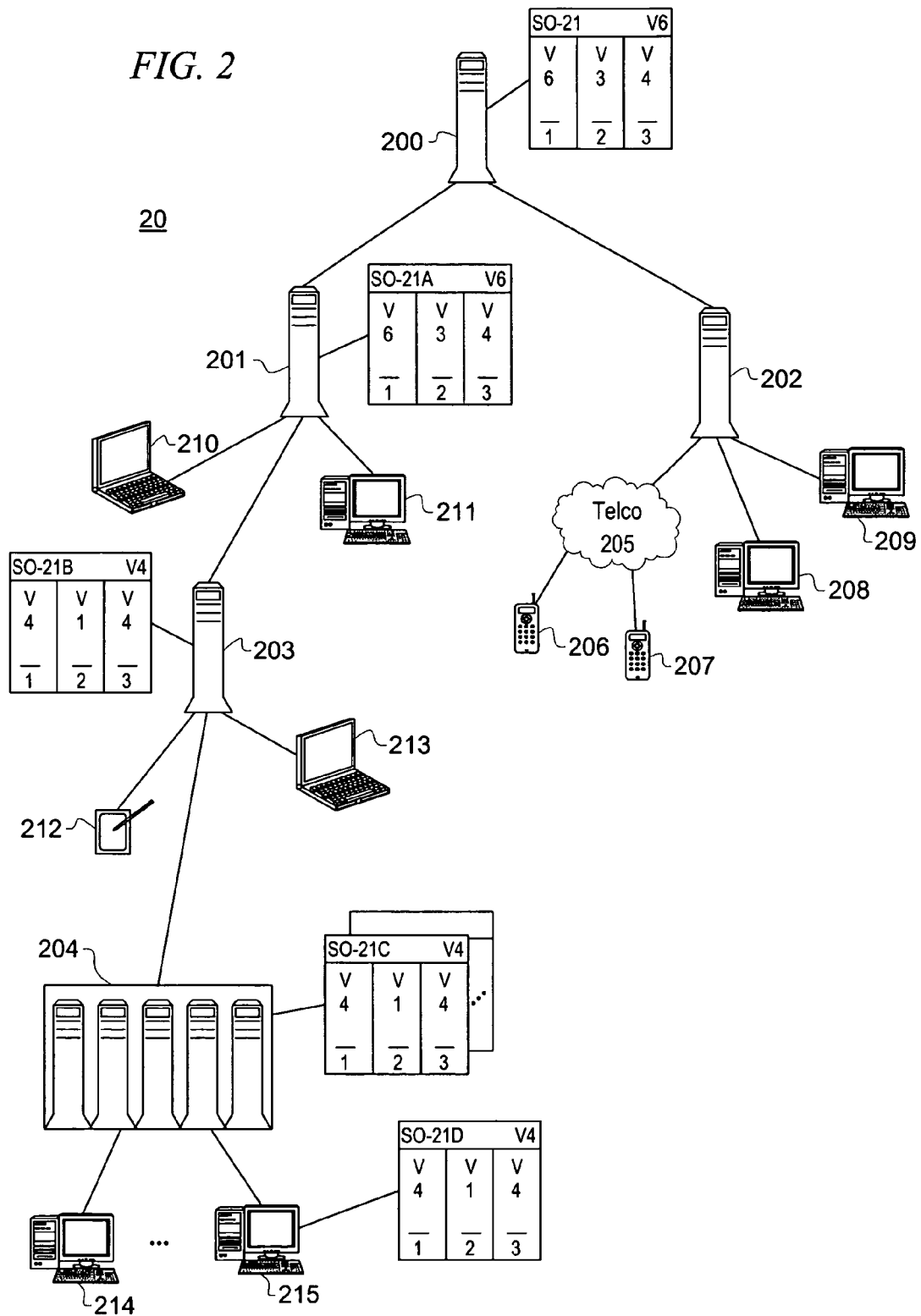
FIG. 2 is a block diagram illustrating an electronic meeting system configured according to another embodiment of the present invention.

FIG. 2 is a block diagram illustrating electronic meeting system 20 configured according to another embodiment of the present invention. The architecture of electronic meeting system 20 is similar to the architecture of electronic collaboration system 10 (FIG. 1). However, electronic meeting system 20 includes additional collaboration edge servers to provide further scalability to any given electronic meeting. Central meeting server 200 provides the management and direct processing for one or more electronic meetings. Participants 206-215 each connect into an electronic meeting administered and managed by central meeting server 200. However, participants 206-215 connect into the electronic meeting through collaboration edge servers. This allows the 10 participants, participants 206-215, to appear as only two connections into central meeting server 200.

Participants 206-209 each connect to the electronic meeting managed by central meeting server 200 through collaboration edge server 202. Moreover, participants 206 and 207, which connect using mobile phones, connect to collaboration edge server 202 through Telco 205. This connection between participants 206 and 207, Telco 205, and collaboration edge server 202 included technology described in commonly-assigned, co-pending, U.S. patent application Ser. No. 11/263,582, entitled, "SELECTIVELY PORTING MEETING OBJECTS," the disclosure of which is incorporated herein. Embodiments of this described technology allow parts of the electronic meeting to be transmitted and presented to participants 206 and 207 on the more-limited capability of the mobile phone.

Participants 210 and 211 connect into the electronic meeting run by central meeting server 200 through collaboration edge server 201. Another connection into collaboration edge server 201 is another edge server, collaboration edge server 203. Participants 212 and 213 connect into the electronic meeting managed by central meeting server 200 through collaboration edge server 203 and collaboration edge server 201. A connection into collaboration edge server 203 is an edge server cluster, collaboration edge server cluster 204, which is a farm of multiple collaboration edge servers that operate together in a server cluster. Therefore, participants 214 and 215 each connect to the electronic meeting through one of the edge servers in collaboration edge server cluster 204.

When an electronic collaboration system includes multiple vertical layers, such as electronic meeting system 20, as opposed to mainly horizontal layers, such as electronic collaboration system 10 (FIG. 1), the described embodiment of the present invention may also operate to streamline the management of the shared objects by the intermediate collaboration edge servers. For example, participant 215 desires to change the data in slot 2 of SO-21D. Participant 215 transmits to collaboration edge server cluster 204 the proposed change to slot 2, the container version number of slot 2 (ver 1), and the container version number of SO-21D resident on participant 215 (ver. 4). Collaboration edge server cluster 204 checks the transmitted versions against the container version number of SO-21C (ver. 4). Because the version numbers of the shared object, SO-21 match, collaboration edge server cluster 204 forwards the change request up to collaboration edge server 203.

In the further transmission of the change request, collaboration edge server cluster 204 transmits the proposed change and the slot and container version numbers of the local shared object instance, SO-21C/D. Collaboration edge server 203 checks the transmitted container version number against its own local shared object instance, SO-21B. Again, all versions of SO-21B and C/D are version 4. With the match, collaboration edge server 203 transmits the change request up to collaboration edge server 201.

As before, the transmission includes the proposed change to slot 2 and the two version numbers. Collaboration edge server 201 compares the received container version number against its own instance of the shared object, SO-21A. However, because the container version of SO-21A is 6 instead of 4, collaboration edge server 201 rejects the requested change. This rejection in the shared object administration system is, again, performed by an edge server without increasing the load on central meeting server 200.

Moreover, collaboration edge server 201 does not merely reject the change and continue operation as normal. With the rejection, collaboration server 201 sends a complete copy of its version of the shared object SO-21A. Thus, as the change rejection is propagated from collaboration edge server 201 to edge server 203 to edge server cluster 204 and then participant 215, the shared object version is updated on each of SO-21B/C/D to version 6. Here again, an edge server, collaboration edge server 201 provides updating of the shared object, SO-21, without requiring any additional processing power from central meeting server 200. This distribution of selected portions of the meeting system management allows central meeting server 200 to operate much more efficiently.

Figure 3:
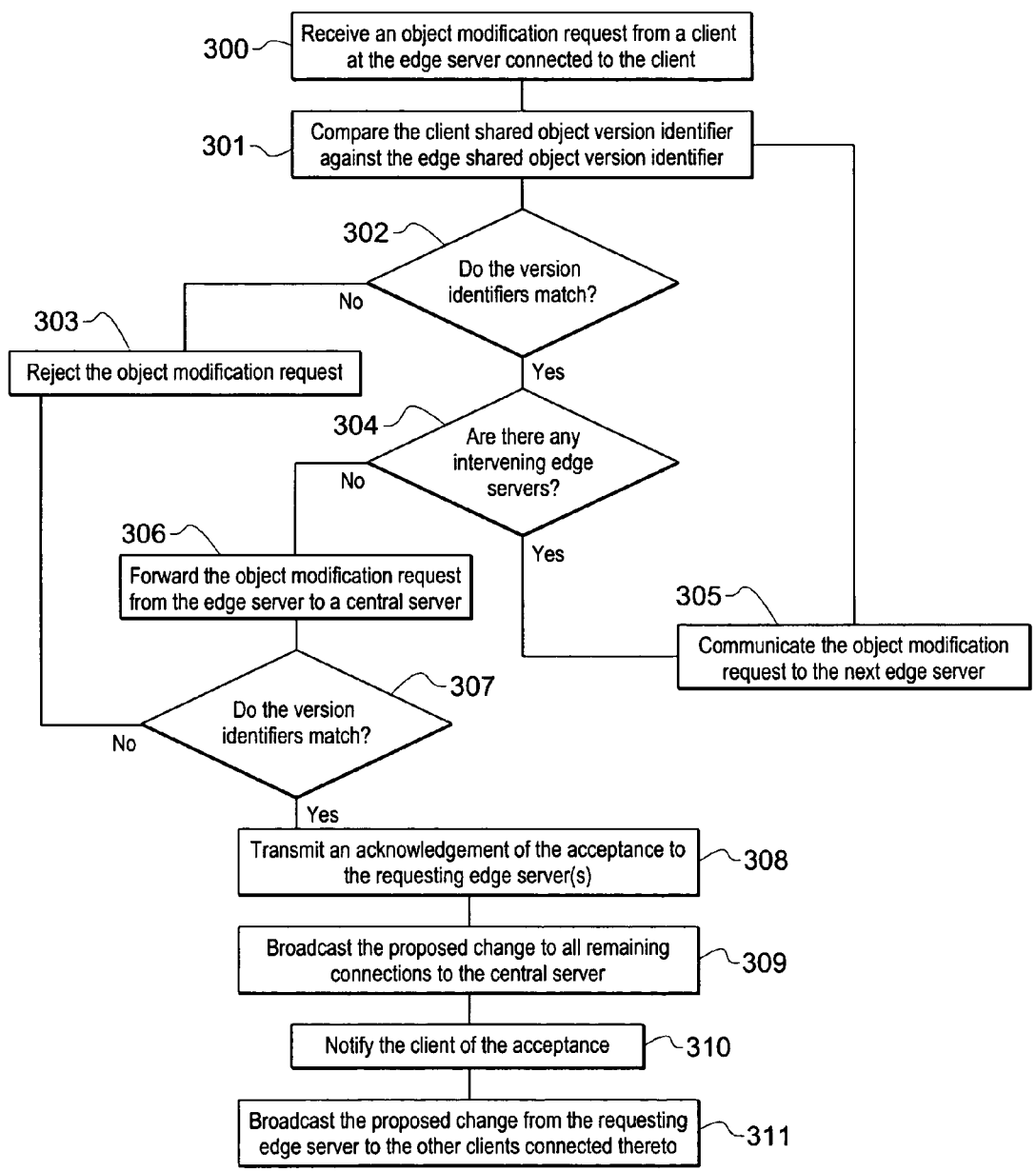
FIG. 3 is a flowchart illustrating example steps executed in implementing one embodiment of the present invention.

FIG. 3 is a flowchart illustrating example steps executed in implementing one embodiment of the present invention. In step 300, an object modification request is received from a client at the edge server connected to the client. The client shared object version identifier is compared, in step 301, against the edge shared object version identifier. In step 302, a determination is made whether the version identifiers match. If not, then, in step 303, the object modification request is rejected. If the versions do match, a determination is made, in step 304, whether there are any intervening edge servers. If there are intervening edge serves, then, in step 305, the object modification request is communicated to the next edge server. The comparison of step 301 is then performed. If there are no intervening edge servers, then, in step 306, the object modification request is forwarded from the first edge server to a central server. In step 307, a determination is made whether the version identifier matches the central server version identifier. If not, the object modification request is rejected, in step 303. Otherwise, if the versions do match, an acknowledgement of the acceptance is transmitted to the requesting edge server(s) in step 308. The proposed change is broadcast, in step 309, to all remaining connections to the central server. The client is notified of the acceptance in step 310. In step 311, the proposed change is broadcast from the requesting edge server to the other clients connected thereto.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 4:
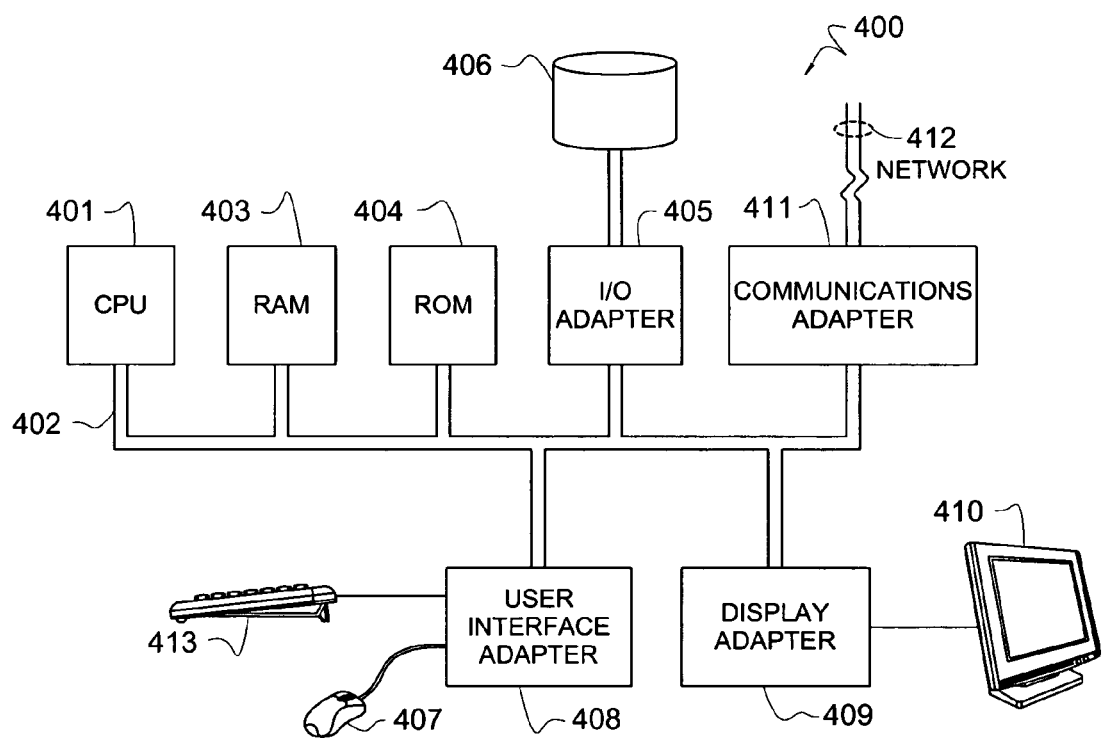
FIG. 4 illustrates a computer system adapted to use embodiments of the present invention.

FIG. 4 illustrates computer system 400 adapted to use embodiments of the present invention, e.g. storing and/or executing software associated with the embodiments. Central processing unit (CPU) 401 is coupled to system bus 402. The CPU 401 may be any general purpose CPU. However, embodiments of the present invention are not restricted by the architecture of CPU 401 as long as CPU 401 supports the inventive operations as described herein. Bus 402 is coupled to random access memory (RAM) 403, which may be SRAM, DRAM, or SDRAM. ROM 404 is also coupled to bus 402, which may be PROM, EPROM, or EEPROM. RAM 403 and ROM 404 hold user and system data and programs as is well known in the art.

Bus 402 is also coupled to input/output (I/O) controller card 405, communications adapter card 411, user interface card 408, and display card 409. The I/O adapter card 405 connects storage devices 406, such as one or more of a hard drive, a CD drive, a floppy disk drive, a tape drive, to computer system 400. The I/O adapter 405 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 411 is adapted to couple the computer system 400 to a network 412, which may be one or more of a telephone network, a local (LAN) and/or a wide-area (WAN) network, an Ethernet network, and/or the Internet network. User interface card 408 couples user input devices, such as keyboard 413, pointing device 407, and the like, to the computer system 400. The display card 409 is driven by CPU 401 to control the display on display device 410.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A computer implemented method comprising:

receiving a modification request for a shared object from a client at an edge server from among multiple edge servers of a distributed computing environment having a central server in communication with said multiple edge servers, said modification request including a shared object modification and a client version identifier for said shared object;

comparing, by said edge server, the client version identifier for said shared object assigned by said client against an edge version identifier for said shared object;

forwarding said modification request from said edge server to the central server responsive to said comparing resulting in the edge version identifier for said shared object matching the client version identifier for said shared object;

comparing, by the central server, the client version identifier for said shared object against a central version identifier for said shared object;

accepting, by the central server, said modification request when said comparing against the central version identifier for said shared object results in the central version identifier for said shared object matching the client version identifier for said shared object;

transmitting, by the central server, an acknowledgement of said accepting to said edge server that forwarded the client's modification request;

transmitting by the central server, (i) the shared object modification and (ii) the client version identifier for said shared object to one or more other edge servers from the multiple edge servers different from said edge server that forwarded the client's modification request;

receiving the acknowledgement from said central server by said edge server that forwarded the client's modification request;

transmitting, by said edge server responsive to said receiving the acknowledgment, (i) the shared object modification and (ii) the client version identifier for said shared object to one or more other clients connected to said edge server different from said client that issued the modification request; and
notifying said client by said edge server of said receiving the acknowledgment.

2. The method of claim 1 further comprising:
communicating, by said edge server, said modification request to one or more intermediate edge servers connected between said edge server and said central server;
evaluating said client version identifier for said shared object against an intermediate edge version identifier for said shared object by each of said one or more intermediate edge servers; and
forwarding said modification request to said central server for a result of said evaluating that comprises each intermediate edge version identifier for said shared object matching the client version identifier for the shared object.

3. The method of claim 2,
wherein said transmitting by the central server comprises transmitting (i) the shared object modification and (ii) the client version identifier for said shared object to said one or more other edge servers from the multiple edge servers different from said edge server that forwarded the client's modification request that are different from edge servers which communicate with the central server through at least one of said one or more intermediate edge servers,
wherein said transmitting the acknowledgement by the central server to said edge server comprises relaying the acknowledgement via the one or more intermediate edge servers, the method further comprising:
receiving the acknowledgement by an intermediate edge server from a previous intermediate edge server and transmitting the acknowledgement to a successive intermediate edge server; and
transmitting, by the intermediate edge server, (i) the shared object modification and (ii) the client version identifier for said shared object to clients connected to the intermediate edge server or to edge servers connected to the intermediate edge server that are different from the previous intermediate edge server and the successive intermediate edge server.

4. The method of claim 1 further comprising:
rejecting, by said edge server, said modification request responsive to said comparing resulting in the edge version identifier for said shared object mismatching the client version identifier for said shared object; and
responsive to rejecting, updating a client instance of said shared object from said edge server.

5. The method of claim 1 further comprising:
rejecting, by said edge server, said modification request responsive to said comparing resulting in the edge version identifier for said shared object mismatching the client version identifier for said shared object; and
responsive to said rejecting, notifying said client of an outdated version of said shared object.

6. The method of claim 1 wherein said client version identifier for said shared object comprises a slot version identifier of said shared object.

7. A computer implemented method comprising:
receiving a modification request for shared data from a client of a distributed collaboration environment at an associated one of multiple edge servers in said distributed collaboration environment, the multiple edge servers in communication with a central server, the modification request including a shared data modification and a client version identifier for the shared data;
determining, by the associated one of the multiple edge servers, that the client version identifier for the shared data matches an edge version identifier for the shared data;
forwarding said modification request to the central server of said distributed collaboration environment responsive to said determining;
establishing, by the central server, that the client version identifier for the shared data matches a central version identifier for the shared data
signaling, by the central server, to the associated one of the multiple edge servers to implement the shared data modification included in the modification request to one or more other clients connected to the associated one of the multiple edge servers different from the client that initiated the modification request;
propagating, by the central server, the shared data modification included in the modification request to one or more other edge servers connected to said central server that are different from said edge server that forwarded the client's modification request, wherein said one or more other edge servers implement the shared data modification included in the modification request to each of a plurality of connected clients;
implementing, by the associated one of the multiple edge servers responsive to said signaling, the shared data modification included in the modification request to the one or more other clients connected to said edge server different from said client that initiated the modification request; and
notifying the client by the associated one of the multiple edge servers of said signaling.

8. The method of claim 7 wherein said forwarding comprises:
communicating said modification request to one or more intermediate edge servers from among said multiple edge servers connected between said associated one and said central server;
determining that said client version identifier for the shared data matches an intermediate edge version indicator for the shared data for each of said one or more intermediate edge servers; and
forwarding said modification request to said central server responsive to each of said determining.

9. The method of claim 8,
wherein said one or more other edge servers from the multiple edge servers different from said edge server that forwarded the client's modification request are different from edge servers which communicate with the central server through at least one of said one or more intermediate edge servers,
wherein said signaling by the central server to said associated one of the multiple edge servers comprises signaling via the one or more intermediate edge servers, the method further comprising:
propagating, by an intermediate edge server from among the one or more intermediate edge servers, the shared data modification included in the modification request to clients connected to the intermediate edge server or to edge servers connected to the intermediate edge server that are different from a previous intermediate edge server and a successive intermediate edge server.

10. The method of claim 7 wherein said client version identifier for the shared data comprises a slot version identifier of said shared data.

11. One or more non-transitory storage mediums encoded with computer program code comprising:
- code for receiving a modification request for a shared object from a client at an edge server from among multiple edge servers that are in communication with a central server, said modification request including a shared object modification and a client version identifier for said shared object;
- code for comparing, by said edge server, the client version identifier for said shared object against an edge version identifier for said shared object;
- code for forwarding said modification request from said edge server to the central server responsive to said comparing resulting in the edge version identifier for said shared object matching the client version identifier for said shared object;
- code for comparing, by the central server, the client version identifier for said shared object against a central version identifier for said shared object;
- code for accepting, by the central server, said modification request when said comparing against the central version identifier for said shared object results in the central version identifier for said shared object matching the client version identifier for said shared object;
- code for transmitting, by the central server, an acknowledgement of said accepting to said edge server that forwarded the client's modification request;
- code for transmitting, by the central server, (i) the shared object modification and (ii) the client version identifier for said shared object to one or more other edge servers from the multiple edge servers different from said edge server that forwarded the client's modification request;
- code for receiving the acknowledgement from said central server by said edge server that forwarded the client's modification request;
- code for transmitting, by said edge server responsive to said receiving the acknowledgment, (i) the shared object modification and (ii) the client version identifier for said shared object to one or more other clients connected to said edge server different from said client that issued the modification request; and
- code for notifying said client by said edge server of said receiving the acknowledgment.

12. The one or more non-transitory storage mediums encoded with the code of claim 11 further comprising:
- code for rejecting, by said edge server, said modification request responsive to said comparing resulting in the edge version identifier for said shared object mismatching the client version identifier for said shared object; and
- responsive to execution of said code for rejecting, code for updating a client instance of said shared object from said edge server.

13. The one or more non-transitory storage mediums encoded with the code of claim 11 further comprising:
- code for rejecting, by said edge server, said modification request responsive to said comparing resulting in the edge version identifier for said shared object mismatching the client version identifier for said shared object; and
- responsive to execution of said code for rejecting, code for notifying said client of an outdated version of said shared object.

14. The one or more non-transitory storage mediums encoded with the code of claim 11 wherein said client version identifier for said shared object comprises a slot version identifier of said shared object.

15. A system comprising:
- a central server system of a distributed collaboration environment, the central server system including at least one processor;
- multiple edge server systems in communication with the central server system, the multiple edge server systems including corresponding processors;
- wherein an edge server system from among the multiple edge server systems is configured to:
  - receive a modification request of shared data from a client of said distributed collaboration environment, the modification request including a shared data modification and a client version identifier of the shared data;
  - determine that the client version identifier of the shared data matches an edge version identifier of the shared data; and
  - forward said modification request to the central server of said distributed collaboration environment in response to the determination;
- wherein the central server system is configured to:
  - establish that the client version identifier of the shared data matches a central version identifier of the shared data;
  - signal to the edge server system to implement the shared data modification included in the modification request to one or more other clients connected to the edge server system that are different from the client that initiated the modification request;
  - propagate the shared data modification included in the modification request to one or more other edge server systems connected to central server system that are different from the edge server system that forwarded the client's modification request, wherein the one or more other edge server systems are configured to implement the shared data modification included in the modification request to each of a plurality of connected clients;
- wherein the edge server system is further configured to:
  - implement, responsive to detection of said signal, the shared data modification included in the modification request to the one or more other clients connected to said edge server system that are different from said client that initiated the modification request; and
  - notify the client of said signal from the central server system.

16. The system of claim 15, wherein said edge server is further configured to:
- communicate said modification request to one or more intermediate edge server systems connected between said edge server system and said central server system;
- determine that said client version of the shared data matches an intermediate edge version of the shared data for each of said one or more intermediate edge servers; and
- forward said modification request to said central server system responsive to each of said determinations.

17. The system of claim 16,
wherein said one or more other edge server systems from the multiple edge server systems different from said edge server system that forwarded the client's modification request are different from edge server systems which communicate with the central server system through at least one of said one or more intermediate edge server systems, wherein the central server system is configured to signal to said edge server system via the one or more intermediate edge servers, and wherein an intermediate server system from among said one or more intermediate edge server systems is further configured to propagate the shared data modification included in the modification request to clients connected to the intermediate edge server or to edge servers connected to the intermediate edge server that are different from a previous intermediate edge server and a successive intermediate edge server.

18. The system of claim 15 wherein said client version identifier of the shared data comprises a slot version identifier of said shared data.

\* \* \* \* \*

UNITED STATES PATENT AND TRADEMARK OFFICE
CERTIFICATE OF CORRECTION

| | |
|---|---|
| PATENT NO. | : 7,945,615 B1 |
| APPLICATION NO. | : 11/263590 |
| DATED | : May 17, 2011 |
| INVENTOR(S) | : Pritham Shetty |

It is certified that error appears in the above-identified patent and that said Letters Patent is hereby corrected as shown below:

Column 12, line 42, after "object", please delete "assigned by said client".

Column 14, at the end of line 14 after "data", please insert -- ; --.

Signed and Sealed this
Twenty-sixth Day of July, 2011

David J. Kappos
*Director of the United States Patent and Trademark Office*